United States Patent
Ormachea et al.

(10) Patent No.: US 7,315,252 B2
(45) Date of Patent: Jan. 1, 2008

(54) ASSEMBLY MACHINE OPERATOR INTERFACE WITH MULTIPLE COLOR LIGHT INDICATORS

(75) Inventors: Raymond Ormachea, Fraser, MI (US); Robert Bailey, Waterford, MI (US)

(73) Assignee: Automated Solutions, Shelby Township, MI (US)

( * ) Notice: Subject to any disclaimer, the term of this patent is extended or adjusted under 35 U.S.C. 154(b) by 158 days.

(21) Appl. No.: 11/078,665

(22) Filed: Mar. 11, 2005

(65) Prior Publication Data

US 2005/0251269 A1 Nov. 10, 2005

Related U.S. Application Data

(60) Provisional application No. 60/567,995, filed on May 4, 2004.

(51) Int. Cl.
*G08B 21/00* (2006.01)
(52) U.S. Cl. .................. 340/679; 340/680; 340/815.45
(58) Field of Classification Search ................ 340/679, 340/523, 686.5, 524, 525, 540, 332, 691.6, 340/815.43, 815.45, 815.55, 815.65, 815.69, 340/815.56, 680; 700/17, 83; 439/894
See application file for complete search history.

(56) References Cited

U.S. PATENT DOCUMENTS

| | | | | |
|---|---|---|---|---|
| 4,099,481 A | * | 7/1978 | Lyons | ........................ 118/702 |
| 4,209,949 A | * | 7/1980 | Staats et al. | ................... 451/24 |
| 4,836,683 A | * | 6/1989 | Aoyama | ....................... 366/98 |
| 4,847,837 A | | 7/1989 | Morales et al. | |
| 5,185,866 A | | 2/1993 | Francisco | |
| 5,436,909 A | | 7/1995 | Dev et al. | |
| 5,724,062 A | * | 3/1998 | Hunter | ........................ 345/102 |
| 5,748,872 A | | 5/1998 | Norman | |
| 5,751,933 A | | 5/1998 | Dev et al. | |
| 6,026,838 A | * | 2/2000 | Nicewonger et al. | ........... 137/2 |
| 6,381,503 B1 | * | 4/2002 | Dollhopf et al. | ............... 700/22 |
| 6,608,272 B2 | | 8/2003 | Garcia | |
| 6,626,557 B1 | * | 9/2003 | Taylor | ......................... 362/249 |
| 6,646,545 B2 | | 11/2003 | Bligh | |
| 6,671,572 B1 | * | 12/2003 | Craft et al. | .................. 700/184 |
| 6,993,404 B2 | * | 1/2006 | Lev-Ami et al. | ............ 700/109 |
| 2001/0010185 A1 | * | 8/2001 | Peters et al. | ................... 83/581 |

* cited by examiner

*Primary Examiner*—Brent A. Swarthout
(74) *Attorney, Agent, or Firm*—Carlson, Gaskey & Olds

(57) ABSTRACT

An assembly machine display has an image representative of a workpiece to be assembled using the machine. Multi-colored indicator lights mounted behind a display substrate are associated with areas on the workpiece image that require a process to be completed by a machine operator. The display substrate has translucent portions that allow the lights to be viewed by a machine operator from the front side of the display. The indicator lights change color to reflect the status of the corresponding area of the workpiece.

9 Claims, 3 Drawing Sheets

ASSEMBLY MACHINE OPERATOR INTERFACE WITH MULTIPLE COLOR LIGHT INDICATORS

This application claims priority to U.S. Provisional Patent Application No. 60/567,995 filed on May 4, 2004.

BACKGROUND OF THE INVENTION

This invention relates to a display for an assembly machine.

Assembly machines commonly have indicator lights associated with the machine. The indicator lights are used to signify when an assembly process is ready to proceed, or has been completed. For example, a light would illuminate to indicate when the current assembly process has completed. This is often used in machines that require drilling, welding, or application of fastening devices. The indicator lights are used to visually indicate to the operator when the process is complete.

The indicator lights have been known to consist of two separate lights. A first light having one color, which is lit to indicate the work still needs to be performed and a second light, of another color, to indicate when a process is properly completed. Having two separate lights increases the cost of the assembly machine. These lights can be unsightly. In addition, the number and positions of the indicator lights for workpieces that require multiple steps or processes can be confusing.

Known displays have relatively large light indicators protruding out from a base surface. The size of conventional lights can make it difficult to indicate all locations of multiple processes on a display. This is especially true when multiple colors are required at each of the multiple locations on the display.

A display is needed that easily correlates the indicator light to the position of the workpiece to which it corresponds and which is pleasing to the eye.

SUMMARY OF THE INVENTION

An exemplary disclosed display includes an image that is a representation of a workpiece. The workpiece has operating points requiring some type of process to be completed by a machine operator. Indicator lights mounted behind the display correspond with points on the image that represent the operating points on the workpiece. Portions of the display are translucent such that the indicator lights can be seen from the front side of the display. The indicator lights are multi-colored. A first color indicates that the workpiece requires work. A second color indicates that the required work has been completed. A control associated with the assembly machine monitors the status of each point in order to change the indicator lights at the appropriate time.

One example display includes a translucent substrate that has a solid coating on one side. Portions of the solid coating are removed and colored to form the image of the workpiece. Other portions of the solid coating are removed and remain uncolored to provide translucent portions for the indicator lights to be seen from the front side of the display.

The various features and advantages of the present invention can be best understood from the following specification and drawings, the following of which is a brief description.

DETAILED DESCRIPTION OF THE PREFERRED EMBODIMENT

Figure 1:
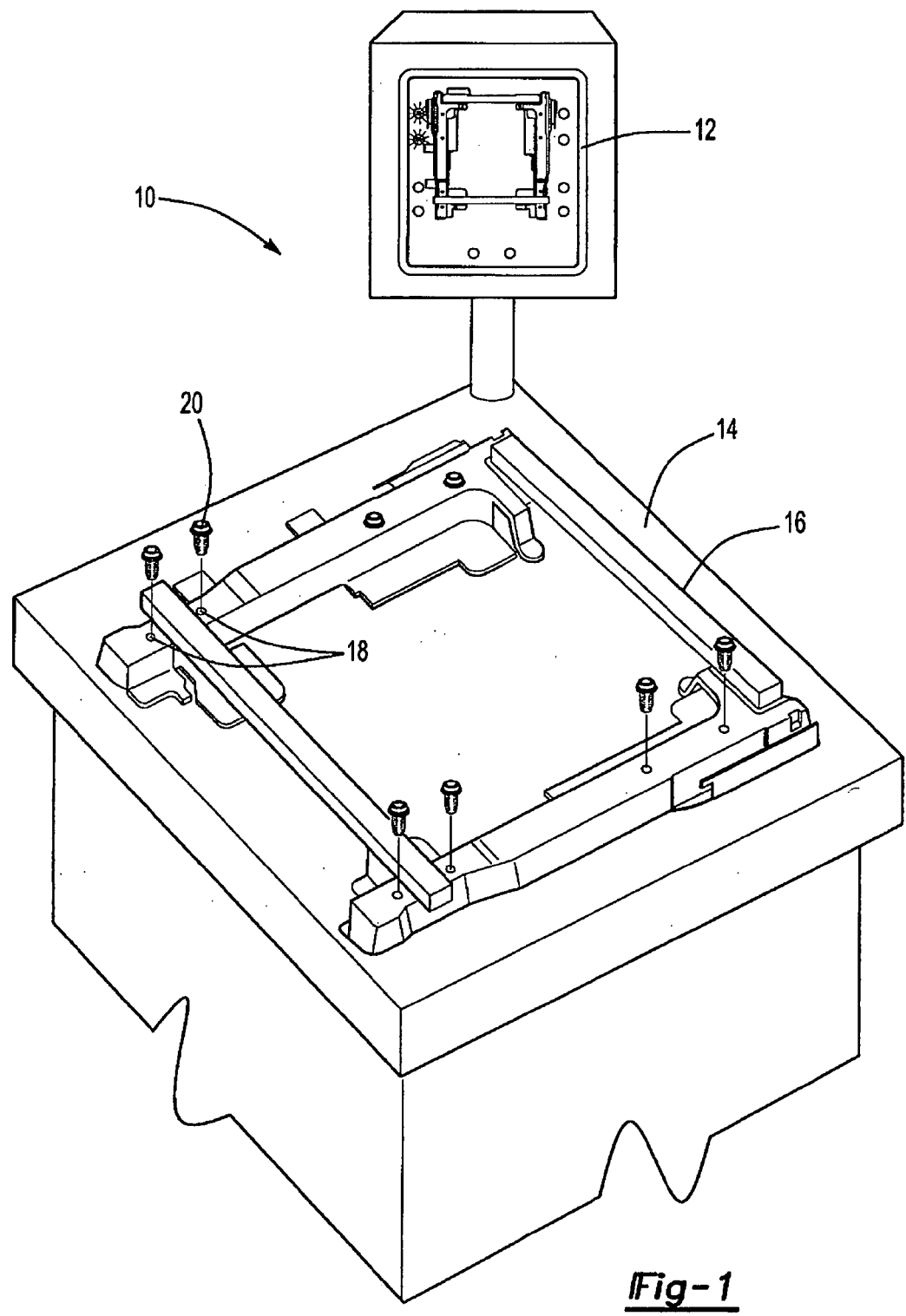
FIG. 1 is a general perspective view of an assembly machine using a display of a first embodiment.

FIG. 1 illustrates an assembly machine 10 having a display 12. The assembly machine 10 has a generally horizontal work surface 14. A workpiece 16 is secured on the work surface 14 in a known manner. The workpiece 16 has operating points 18 which require work by an operator. For example, the operating points 18 may be insert holes for fasteners 20. The operating points 18 may also be locations for drilling, welding, or other operations to be completed by an assembly machine operator.

Figure 2:
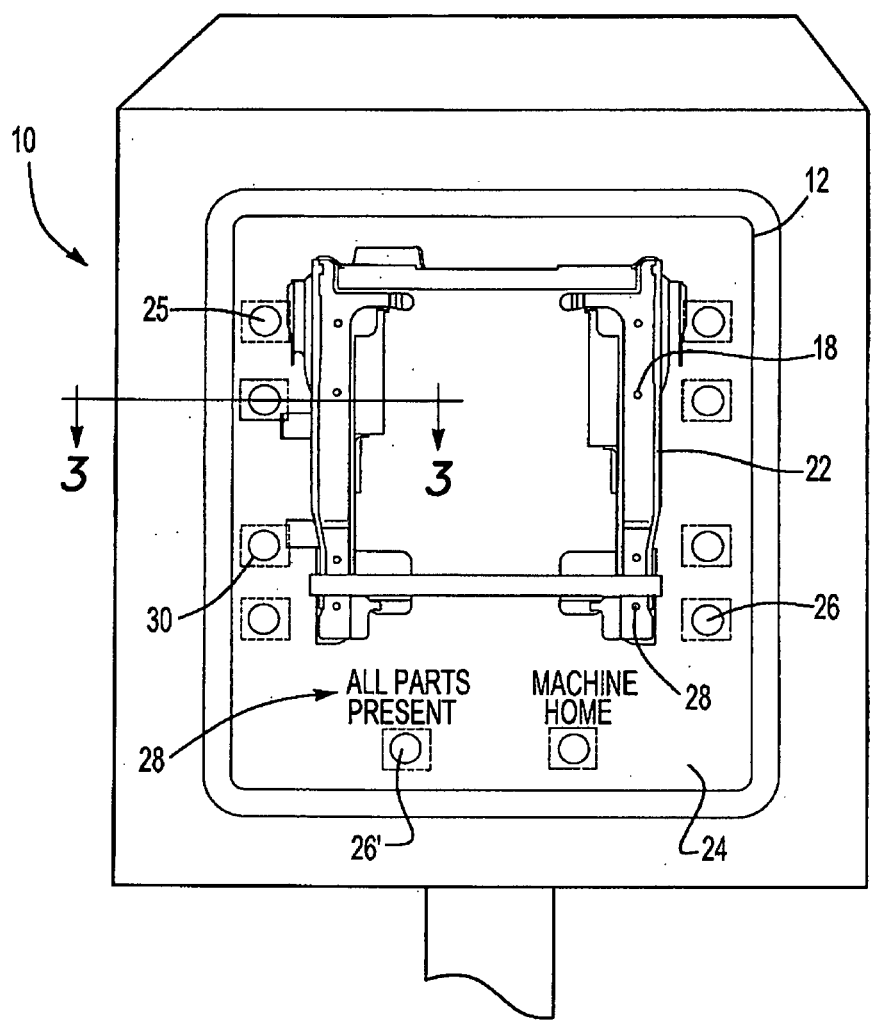
FIG. 2 is an enlarged general view of the display of the first embodiment.

FIG. 2 is an enlarged view of the display 12. The display 12 is mounted to the assembly machine 10 in a location easily viewed by a machine operator. The display 12 has a substrate 21 with an image 22 visible from a first side 24 of the substrate 21. The image 22 in this example is a representation of the workpiece 16 including the operating points 18. The display 12 also includes light indications 25 adjacent each of the representations of the operating points 18. The light indications 25 comprise translucent portions 26 in the substrate 21. The example display 12 includes additional translucent portions 26'. The additional translucent portions 26' are adjacent status information 28 that includes wording for indicating overall machine, or workpiece status, for example.

Figure 3:
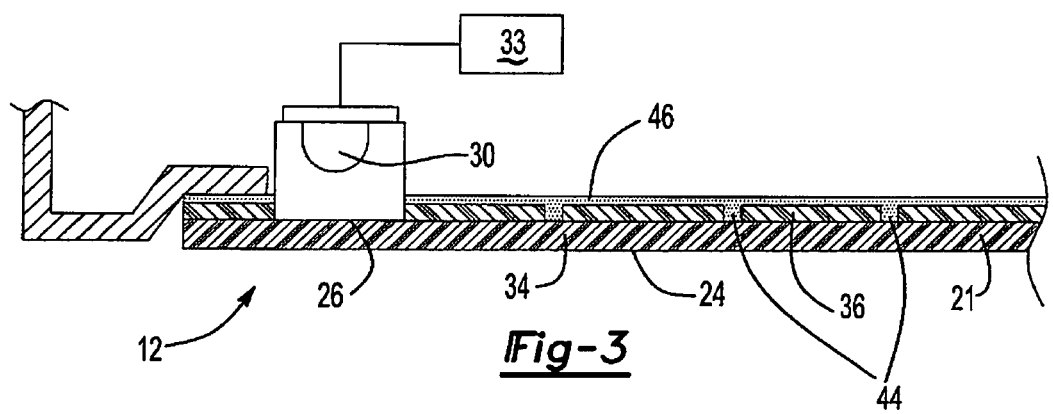
FIG. 3 is a cross-section of the display of FIG. 2 taken on the line 3-3.

FIG. 3 shows indicator lights 30 associated with each of the operating points 18, and with each of the light indications 25. The indicator lights 30 are positioned adjacent a second side 32 of the substrate 21 so that light from the indicator lights 30 can be viewed through the translucent portions 26 and 26' from the first side 24 of the substrate 21.

The indicator lights 30, in one example, comprise multi-colored light emitting diodes (LED). The indicator lights 30 have a first color, representing a first status of each operating point 18. The indicator lights 30 have a second color, representing a second status of each operating point 18. For example, the indicator light 30 may have a red color indicating that the corresponding operating point 18 requires work to be done, and a green color indicating the work has been completed on that operating point 18.

A control 33 monitors the status of the assembly machine 10 and the operating points 18 in a known manner (i.e., whether a tool has been used to tighten a fastener) and changes the corresponding indicator lights 30 from the first color to the second color at the appropriate time.

One advantage to the disclosed example is that a single light source provides multiple colors (and status indications) for each operating point 18. This is significant where display space is limited and a plurality of operating points 18 must be shown.

Another advantage of this example is that the visible or viewed side of the display 12 is smooth and planar. No large lights need protrude from the front side of the display 12.

This maintains better visibility and reduces the possibility of corrosion in an assembly plant, for example.

As can be seen in FIG. 3 the display 12, in this example, has a substrate 21, which comprises a translucent or transparent material. The display 12 has a second material layer 36 on one side of the substrate 21. The second material layer 36, in this example, is applied to the second side 32 of the substrate 21. The second material layer 36 preferably is made from an opaque material, which is colored as desired. In one example, the second material layer 36 is laminated together with the substrate 21.

Figure 4:
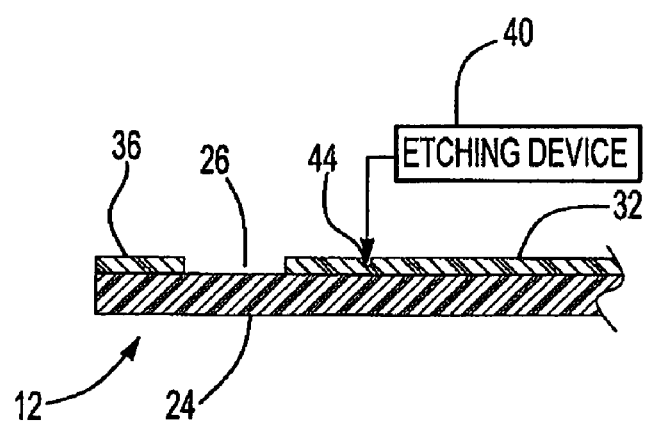
FIG. 4 is a cross-sectional, schematic illustration of an example display during a manufacturing process.
Figure 5:
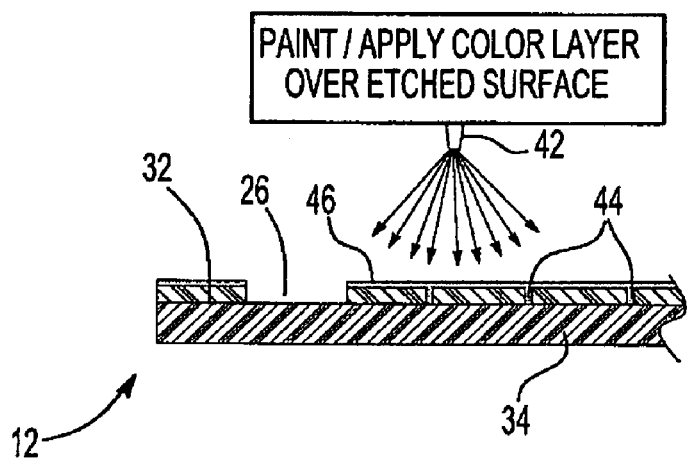
FIG. 5 is a cross sectional, schematic illustration of the display board of FIG. 4 at a later stage.

FIGS. 4-5 schematically illustrate an example process for making the illustrated display 12. This includes removing portions 44 of the second material layer 36 in the shape of the image 22 representing the workpiece 16. Removing the portions 44 of the second material layer 36 can be done by etching, for example. FIG. 4 shows an embodiment using an etching device 40 for removing material.

The exposed portions 44 of the substrate 21 provide the outline of the image 22, for example. FIG. 5 schematically shows adding color to the exposed portions 44 of the second material layer 36. This example has a paint sprayer 42 adding paint 46 to the display 12. A color that contrasts with the color of the second material layer 36 preferably is added by coloring the display 12 from the second side 32. The applied color can be viewed through the translucent substrate 21 along the exposed portions 44. Thus, the image 22 representing the workpiece 16 can be viewed from the first side 24 of the display 12. Alternatively, the image 22 may be left translucent and illuminated from the second side 32 such that the image can be viewed on the first side 24.

In this example, portions of the second material layer 36 also are removed to form the translucent portions 26 and 26'. The translucent portions 26 and 26' can be established before or after the painting process. If done before, a suitable masking technique keeps the translucent portions 26 and 26' free of paint during the process of coloring in the image 22. Color is not added to the transparent portions 26 and 26' so that the indicator lights 30 can be viewed through the translucent portions 26 and 26'.

Once the image 22 and light indications 25 are established on the substrate 21, the indicator lights 30 are secured in place corresponding to the translucent portions 26 and 26'. In one example, a housing for each indicator light 30 is secured directly to the back side of the substrate 21.

Although a preferred embodiment of this invention has been disclosed, a worker of ordinary skill in this art would recognize that certain modifications may come within the scope of this invention. For that reason, the following claims should be studied to determine the true scope of protection granted for this invention.

We claim:

1. An assembly machine display comprising:
a display having an image, which comprises a representation of a work piece, visible on a first side of the display; and
at least one multi-colored indicator light mounted near an oppositely facing, second side of the display, such that the multi-colored indicator light is visible from the first side of the display, the multi-colored indicator light is positioned relative to the image in a location that corresponds to an operating point and the multi-colored indicator light illuminates the location with a first color prior to work being done at the operating point and changes color to illuminate the location with a second color responsive to the work being done at the operating point.

2. The display of claim 1, wherein the multi-colored indicator light comprises a multi-colored light emitting diode.

3. The display of claim 1, wherein the display comprises a translucent substrate having at least a portion near the multi-colored indicator light exposed to allow the multi-colored indicator light to be visible from the first side.

4. The display of claim 3, wherein the display includes a solid coating over another portion of the substrate and wherein the image is on the portion having the solid coating.

5. An assembly machine comprising:
a first surface for supporting a workpiece;
a display panel having an image of the workpiece visible on a first side of the display panel;
at least one multi-colored indicator light mounted near an oppositely facing, second side of the display panel, such that light from the multi-colored indicator light is visible from the first side of the display panel the multi-colored indicator light changing colors for indicating when a process involving the workpiece is completed.

6. The assembly machine of claim 5, wherein the multi-colored indicator light comprises a multi-colored light emitting diode.

7. The assembly machine of claim 5, wherein the multi-colored indicator light is positioned near a portion of the image that corresponds to a portion of the workpiece involved in the process.

8. The assembly machine of claim 5, wherein the display comprises a translucent substrate having at least a portion near the multi-colored indicator light exposed to allow the multi-colored indicator light to be visible from the first side.

9. The assembly machine of claim 8, wherein the display includes a solid coating over another portion of the substrate and wherein the image is on the portion having the solid coating.

* * * * *